United States Patent [19]
Visser

[11] 3,785,338
[45] Jan. 15, 1974

[54] SYSTEM FOR INDICATING THE POSITION OF A CONTROL MEMBER ADJUSTABLE BY MEANS OF A HANDWHEEL AND SPINDLE

[75] Inventor: Jan Cornelis Visser, Soensdrecht, Netherlands

[73] Assignee: B.V. Maschinefabrik en Ilzergietery Holland-Bergen op Zoom, Bergen op Zoom, Netherlands

[22] Filed: Nov. 8, 1971

[21] Appl. No.: 196,572

[30] Foreign Application Priority Data
Nov. 11, 1970 Netherlands........................ 7016473

[52] U.S. Cl.................................. 116/125, 137/553
[51] Int. Cl............................................. F16k 37/00
[58] Field of Search..................... 116/125; 137/364, 137/362, 553, 68; 74/801

[56] References Cited
UNITED STATES PATENTS

| | | | |
|---|---|---|---|
| 467,796 | 1/1892 | Ferrell | 116/125 |
| 2,959,149 | 11/1960 | Schwenk | 116/125 |
| 3,238,968 | 3/1966 | Pecis | 137/556 |
| 3,505,972 | 4/1970 | Benjamin | 116/125 |

*Primary Examiner*—Louis J. Capozi
*Attorney*—John P. Snyder

[57] ABSTRACT

A system for indicating the position of a control member adjustable by means of a handwheel and a spindle, in which the handwheel or a part connected thereto has an aperture and a surface provided with indicia is situated behind the aperture and can perform a relative rotation with respect to the handwheel about the spindle and is coupled to the spindle via means which rotate the said surface from an initial position through a given angle with respect to the spindle in dependence on the number of spindle revolutions.

7 Claims, 3 Drawing Figures

PATENTED JAN 15 1974
3,785,338
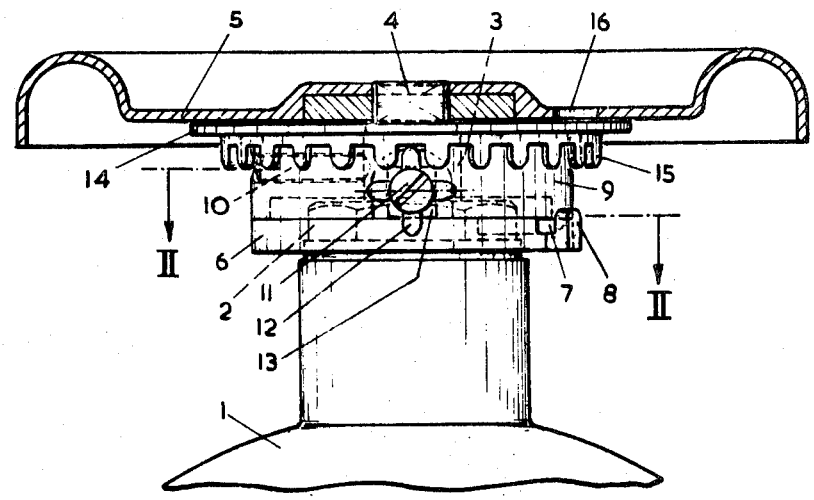
FIG.1
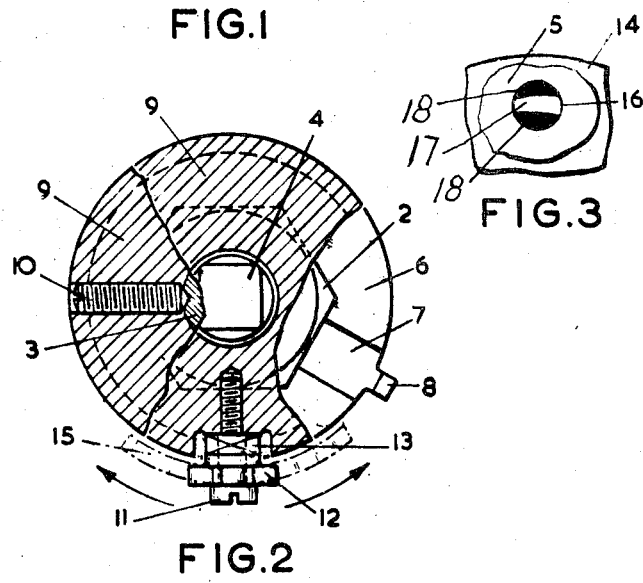
FIG.3
FIG.2
INVENTOR
JAN J. VISSER
BY
ATTORNEY

SYSTEM FOR INDICATING THE POSITION OF A CONTROL MEMBER ADJUSTABLE BY MEANS OF A HANDWHEEL AND SPINDLE

This invention relates to a system for indicating the position of a control member adjustable by means of a handwheel and a spindle, more particularly a gate valve comprising a gate which is movable in a housing and which can be adjusted with respect to the associated seat by means of a handwheel via a non-rising screw rod. With a system of this kind, the gate is actuated by cooperation of the screw rod and a nut disposed in the gate. Consequently, the position of the gate is not visible from the outside of the valve. To check on how far the valve is open, the valve must first be completely opened or closed and a count must be made of how many handwheel revolutions were required for the purpose.

The object of the invention is to provide a system of the above type with which it is immediately possible to see the position of the valve gate. According to the invention, the handwheel or a part connected thereto has an aperture and a surface provided with indicia is situated behind the aperture and can perform a relative rotation with respect to the handwheel about the spindle and is coupled to the spindle via means which rotate the said surface from an initial position through a given angle with respect to the spindle in dependence on the number of spindle revolutions.

With a valve of this kind, the position of the indicia on the rotatable surface with respect to the handwheel apertures immediately shows how far the gate has been moved from the initial position.

According to the invention, the surface bearing the indicia forms part of a member which is provided with a gear rim cooperating with a star wheel mounted on a member rigidly secured to the spindle and secured against rotation during the major part of one spindle revolution and rotating at once through one tooth per revolution by cooperating with a stop fixed in the path of the star wheel. This gives a refinement of the indication by producing a rotation of the star wheel a number of times per revolution. The surface is thus adjusted a number of times per revolution with respect to the handwheel. Under normal conditions, a satisfactory adjustment is one which occurs once per revolution.

According to the invention, fixing of the star wheel can be facilitated if the star wheel is rigidly connected to a hub having flat side surfaces, one surface of which slides along a fixed edge when the member bearing the star wheel is rotated, said edge having a recess in front of which is a fixed tooth which cooperates with the star wheel as soon as the flat surface reaches the recess. The stop fixed in the path of the star wheel is formed by the tooth situated in front of the recess. The recess automatically eliminates the security against rotation as soon as the tooth cooperates with the star wheel.

The invention will be explained in detail in the following description of one exemplified embodiment with reference to the drawing wherein:

FIG. 1 is a partial elevation and partial cross-section of the top part of a gate valve according to the invention.

FIG. 2 is a cross-section on the line II—II in FIG. 1,

FIG. 3 is a top plan view of a detail of FIG. 1.

Reference 1 denotes the housing of a gate valve having a non-rising rod, i.e. when the rod is rotated to actuate the gate the latter moves up and down but the rod undergoes no axial displacement.

The housing is closed at the top by a closure member 2, through which the actuating rod 3 extends to the exterior. One end of the rod 3 is square (4), a handwheel 5 being secured thereto.

A ring 6 rests on the closure member 2 and engages by a matching opening around the hexagonal part of the closure member 2. This secures the ring 6 against rotation with respect to the closure member 2 and hence with respect to the housing 1. The ring 6 has a recess 7 extending radially. A tooth-shaped cam 8 is situated opposite the recess 7 on the outside and the significance of the recess 7 and cam 8 will be explained hereinafter.

A bowl-shaped ring 9 rests by a downwardly directed edge on the ring 6. The ring 9 is secured to the rod 3 by means of a screw 10. A star wheel 12 provided with a square hub 13 is also rotatably secured to the ring 9 by means of a screw 11. A flat edge of the hub 13 is flush with the bottom of the ring 9. The star wheel 12 is situated at the same distance from the rod 3 as the tooth-shaped cam 8. When the ring 9 rotates, the star wheel 12 is secured against rotation because the flat edge of the hub 13 slides along the top surface of the ring 6. When the flat edge of the hub 13 reaches the recess 7, the star wheel is no longer secured in this way and since it cooperates with the cam 8 the star wheel 12 will be rotated through one tooth. This therefore occurs once per revolution of the rod 3. A ring 14 which is centred with respect to the member 13 rests on the ring 9 and is provided with a downwardly extending gear rim 15 cooperating with the star wheel 12. As long as the latter is secured against rotation, the ring 14 will be driven via the gear rim 15 on rotation of the rod 3 by means of the star wheel 12 and will hence perform the same rotation as the rod 3. The top of the ring 14 is situated just beneath the handwheel 5 which has an aperture 16 through which the top surface of the ring 14 is visible. This top surface of the ring 14 may bear indicia to indicate the position of the valve gate. When the rod 3 is rotated by means of the handwheel 5, the star wheel will be released on each revolution of the rod 3 and be rotated through one tooth, the ring 14 being turned through one tooth with respect to the handwheel 5 via the gear rim 15. As shown in FIG. 3, a gradually widening white strip 17 may, for example, be provided on a black background 18. In the closed position, a black surface is then visible through the aperture 16. As the gate is opened further, the white strip visible becomes increasingly wider. FIG. 3 shows for example, that the gate is half open. This can be read off from the relationship between the black and white areas.

The various parts of the position indicator can be made from plastics, so that a low coefficient of friction is obtained and there is no wear of the parts sliding along one another.

What I claim is:

1. In a valve construction having a body and an actuating shaft rotatable in said body adapted to open and close the valve in response to rotation of said shaft, the combination of:

a cam element fixed to said body and displaced radially of said shaft;

a member fixed to said shaft and a star wheel rotatably mounted on said member about an axis extending radially with respect to said shaft, said star wheel being displaced radially from said shaft by an amount to engage against said cam element for incremental rotation thereby once every revolution of said shaft;

a circular gear element rotatable about the axis of said shaft and in constant mesh with said star wheel so as to be rotated incrementally in consonance with incremental rotation of said star wheel;

a handwheel fixed to said shaft for controlling opening and closing of the valve; and indicator means associated with said circular gear element for indicating the relative open and closed condition of the valve in response to incremental rotation of said gear element;

said star wheel having a hub portion for preventing rotation of the star wheel until the star wheel engages said cam element.

2. In a valve construction as defined in claim 1 wherein said cam element and said gear element are disposed on opposite sides of and closely adjacent to said member.

3. In a valve construction as defined in claim 2 wherein said member is in the form of a ring and said hub portion of the star wheel has a series of flats thereon sequentially rotatable into flush relation with a surface of said member, and said cam element includes a ring-like mounting portion having a surface in juxtaposition to said surface of said member, said mounting portion having a recess in its surface radially aligned with said cam element to allow incremental rotation of said star wheel.

4. In a valve construction as defined in claim 3 wherein said handwheel overlies said gear element and is provided with an opening exposing a portion of said gear element therethrough, said gear element having indicia means thereon selectively exposable through said opening to constitute said indicator means.

5. In a valve construction as defined in claim 1 wherein said handwheel overlies said gear element and is provided with an opening exposing a portion of said gear element therethrough, said gear element having indicia means thereon selectively exposable through said opening to constitute said indicator means.

6. In a valve construction as defined in claim 1 wherein said member is in the form of a ring and said hub portion of the star wheel has a series of flats thereon sequentially rotatable into flush relation with a surface of said member, and said cam element includes a ring-like mounting portion having a surface in juxtaposition to said surface of said member, said mounting portion having a recess in its surface radially aligned with said cam element to allow incremental rotation of said star wheel.

7. In a valve contruction as defined in claim 2 wherein said handwheel overlies said gear element and is provided with an opening exposing a portion of said gear element therethrough, said gear element having indicia means thereon selectively exposable through said opening to constitute said indicator means.

* * * * *

UNITED STATES PATENT OFFICE
CERTIFICATE OF CORRECTION

Patent No. 3,785,338 Dated January 15, 1974

Inventor(s) Jan Cornelis Visser

It is certified that error appears in the above-identified patent and that said Letters Patent are hereby corrected as shown below:

--- [73] Assignee: B.V. Machinefabriek en IJzergieterij
    Holland-Bergen op Zoom, Bergen op
    Zoom, Netherlands ---

Signed and sealed this 9th day of April 1974.

(SEAL)
Attest:

EDWARD M. FLETCHER, JR.  C. MARSHALL DANN
Attesting Officer  Commissioner of Patents